US012387687B2

(12) United States Patent
Jo

(10) Patent No.: US 12,387,687 B2
(45) Date of Patent: Aug. 12, 2025

(54) GATE DRIVING CIRCUIT AND DISPLAY APPARATUS INCLUDING THE SAME

(71) Applicant: LG Display Co., Ltd., Seoul (KR)

(72) Inventor: Sunghak Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/538,685

(22) Filed: Dec. 13, 2023

(65) Prior Publication Data

US 2024/0203359 A1 Jun. 20, 2024

(30) Foreign Application Priority Data

Dec. 15, 2022 (KR) ........................ 10-2022-0176048

(51) Int. Cl.

*G09G 3/3266* (2016.01)
*G09G 3/20* (2006.01)
*G09G 3/36* (2006.01)

(52) U.S. Cl.

CPC ......... *G09G 3/3266* (2013.01); *G09G 3/3677* (2013.01); *G09G 2310/063* (2013.01); *G09G 2310/08* (2013.01)

(58) Field of Classification Search

CPC ........................... G09G 3/3677; G09G 3/3266
See application file for complete search history.

(56) References Cited

U.S. PATENT DOCUMENTS 8,994,629 B2 * 3/2015 Kim ..................... G09G 3/3677 345/87
2014/0044228 A1 * 2/2014 Jang ....................... G11C 19/00 377/64
2016/0224175 A1 * 8/2016 Moon ................... G06F 3/0412
2017/0032733 A1 * 2/2017 Jang ......................... G09G 3/20
2017/0344179 A1 * 11/2017 Kim ..................... G09G 3/3677
2018/0004329 A1 * 1/2018 So ............................ G09G 3/20
2018/0138256 A1 * 5/2018 Han ..................... G09G 3/3225
2022/0093027 A1 * 3/2022 Hong .................. G09G 3/2092

FOREIGN PATENT DOCUMENTS

KR 10-2022-0096845 A 7/2022

* cited by examiner

*Primary Examiner* — Sepehr Azari
(74) *Attorney, Agent, or Firm* — Fenwick & West LLP

(57) ABSTRACT

A gate driving circuit that prevents the discharge of the Q node due to the leakage current in the last stage when the panel is cut, thereby preventing distortion of the gate signal, and a display including the same is disclosed. The gate driving circuit includes a plurality of stages driving a plurality of gate lines, and each of the plurality of stages includes a pull-up transistor pull-up driving an output terminal in response to a signal of a Q node of a N stage; a pull-down transistor pull-down driving an output terminal in response to a signal of a Qb node of the N stage; and a first transistor coupled between a source electrode of the pull-down transistor and a Q node of a N−1 stage, and pull-down driving the Q node of the N−1 stage in response to a signal of the output terminal of the N stage.

20 Claims, 15 Drawing Sheets

GATE DRIVING CIRCUIT AND DISPLAY APPARATUS INCLUDING THE SAME

CROSS-REFERENCE TO RELATED APPLICATION

This application claims priority to and benefit of Republic of Korea Patent Application No. 10-2022-0176048 filed on Dec. 15, 2022, which is hereby incorporated by reference in its entirety.

BACKGROUND

Technical Field

The present disclosure relates to a display apparatus, more particularly, a gate driving circuit and a display apparatus including the same.

Background of the Disclosure

As information society develops, demands for display apparatuses displaying images are increasing in various forms. Various display apparatuses such as liquid crystal display apparatuses and organic light emitting display apparatuses are being utilized.

Such a display apparatus includes a data driving circuit supplying data signals to data lines of a display panel; and a gate driving circuit sequentially supplying data signals to gate lines of the display panel.

Recently, as display apparatuses have become thinner, a technology for embedding a gate driving circuit together with a pixel array into a display panel has been developed. A gate driving circuit embedded in such a display panel is known as a Gate In Panel GIP driving circuit.

SUMMARY

Meanwhile, a gate driving circuit may include a shift resistor including a plurality of stages sequentially outputting gate signals.

Various sizes are required for display panels, and a display panel can be cut to create a desired size. However, the conventional gate driving circuit has an issue where the gate electrode of the transistor driving the Q node is floated by cutting during the last stage of panel cutting. This might lead to distorted gate signals due to discharge of the Q node caused by leakage current.

An objective of an embodiment of the present disclosure is to provide a gate driving circuit that may prevent distortion of a gate signal by preventing the discharge of the Q node due to leakage current during the last stage of the gate driving circuit in display panel cutting.

Aspects and objects according to the present disclosure are not limited to the above ones, and other aspects and advantages that are not mentioned above can be clearly understood from the following description and can be more clearly understood from the embodiments set forth herein by people skilled in the art.

A gate driving circuit according to an embodiment may include a plurality of stages driving a plurality of gate lines. Each of the plurality of stages may include a pull-up transistor pull-up driving an output terminal in response to a signal of a Q node of a N stage; a pull-down transistor pull-down driving an output terminal in response to a signal of a Qb node of the N stage; and a first transistor coupled between a source electrode of the pull-down transistor and a Q node of a N−1 stage and pull-down driving the Q node of the N−1 stage in response to a signal of the output terminal of the N stage.

A gate driving circuit according to another ema plurality of stages driving a plurality of gate lines, and each of the plurality of stages may include a pull-up transistor pull-up driving an output terminal in response to a signal of a Q node of N−1 stage; a pull-down transistor pull-down driving an output in response to a signal of a Qb node of the N−1 stage; and a first transistor coupled between the Q node of the N−1 stage and a source electrode of a pull-down transistor of a N stage, and pull-down driving the Q node of the N−1 stage in response to a signal of an output terminal of the N stage.

A display apparatus according to an embodiment may include a display panel and a gate driving circuit driving the display panel. The gate driving circuit may include a plurality of stages driving a plurality of gate lines. Each of the plurality of stages may include a pull-up transistor pull-up driving an output terminal in response to a signal of a Q node of a N stage; a pull-down transistor pull-down driving an output terminal in response to a signal of a Qb node of the N stage; and a first transistor T1 coupled between a source electrode of the pull-down transistor and a Q node of a N−1 stage and pull-down driving the Q node of the N−1 stage in response to a signal of the output terminal of the N stage.

A display apparatus according to another embodiment of the present disclosure may include a display panel; and a gate driving circuit driving the display panel. The gate driving circuit include a plurality of stages driving a plurality of gate lines. Each of the plurality of stages may include a pull-up transistor TU pull-up driving an output terminal in response to a signal of a Q node of N−1 stage; a pull-down transistor TD pull-down driving an output in response to a signal of a Qb node of the N−1 stage; and a first transistor coupled between the Q node of the N−1 stage and a source electrode of a pull-down transistor of a N stage, and pull-down driving the Q node of the N−1 stage in response to a signal of an output terminal of the N stage 10.

As described above, according to the embodiments, the discharge of the Q node due to the leakage current in the last stage when the panel is cut may be prevented, thereby preventing distortion of the gate signal.

In addition, the distortion of the gate signal due to leakage may be prevented, thereby securing output stability.

In addition, the leakage current of the gate driving circuit may be prevented, thereby reducing power consumption.

In addition, the output of the last stage may be stable, thereby contributing a low bezel at a lower end of the display panel.

In addition, the power consumption may be reduced, thereby driving the display panel with low power.

In addition to the above-described effects, specific effects of the present invention will be described together with the following detailed description for implementing the present invention.

DETAILED DESCRIPTION

Figure 1:
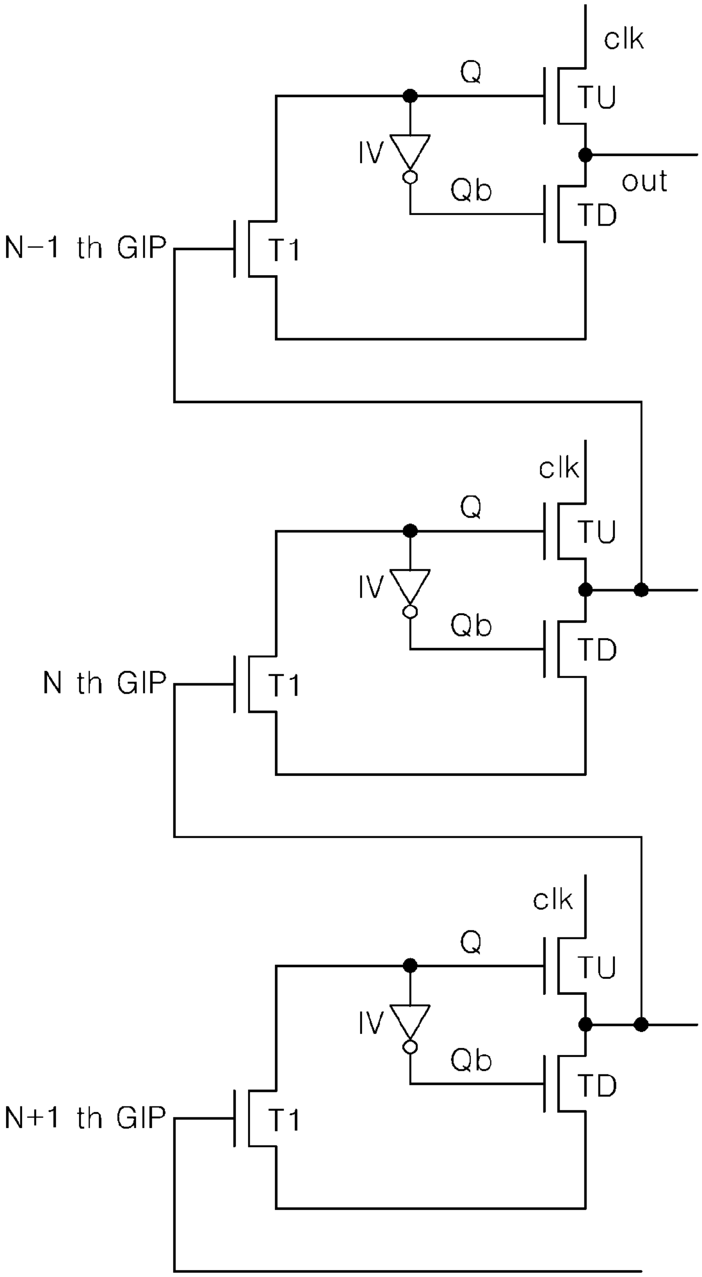
FIG. 1 shows a gate driving circuit according to a first embodiment.

The above objects, features, advantages and methods to achieve them will be described later in detail with reference to the accompanying drawings, and accordingly, those skilled in the art to which the present invention belongs will be able to easily implement the technical idea of the present invention. In describing the present invention, if it is determined that the detailed description of the known technology related to the present invention may unnecessarily obscure the subject matter of the present invention, the detailed description will be omitted.

Hereinafter, preferred embodiments according to the present invention will be described in detail with reference to the accompanying drawings. In the drawings, the same reference numerals are used to indicate the same or similar components, the present disclosure should be construed to extend to any alterations, equivalents and substitutes in addition to those which are particularly set out in the accompanying drawings. Terms of respective elements used in the following description are terms defined taking into consideration of the functions obtained in the present invention. Therefore, these terms do not limit technical elements in the present invention. Further, the defined terms of the respective elements will be called other terms in the art. Terminology that is used in the present disclosure is limited to only for embodiments herewith but made only to make it easy to understand the present disclosure. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In understanding the components, it should be understood as including the error range even if there is no separate explicit description.

When describing time relationship, for example, 'after', 'as soon as', 'right after or next', 'before', etc. Or, unless 'immediately' or 'directly' is used, non-continuous cases may be included.

It will be understood that although the terms first, second, etc. may be used herein to describe various elements, these elements should not be limited by these terms. These terms are generally only used to distinguish one element from another.

Features of various embodiments may be partially or entirely combined with each other, and various connections and driving are possible. Also, embodiments may be implemented independently or implemented in a related relationship.

Hereinafter, display apparatuses according to embodiments of the present disclosure will be described referring to the accompanying drawings.

In the specification, a plurality of stages may be defined as sift resistors configured to sequentially output gate signals to gate lines of a display panel.

A N−1 state or N−1th GIP may be defined as N−1th stage among a plurality of stages. A N stage or Nth GIP may be defined as the Nth stage among the plurality of stages.

Figure 2:
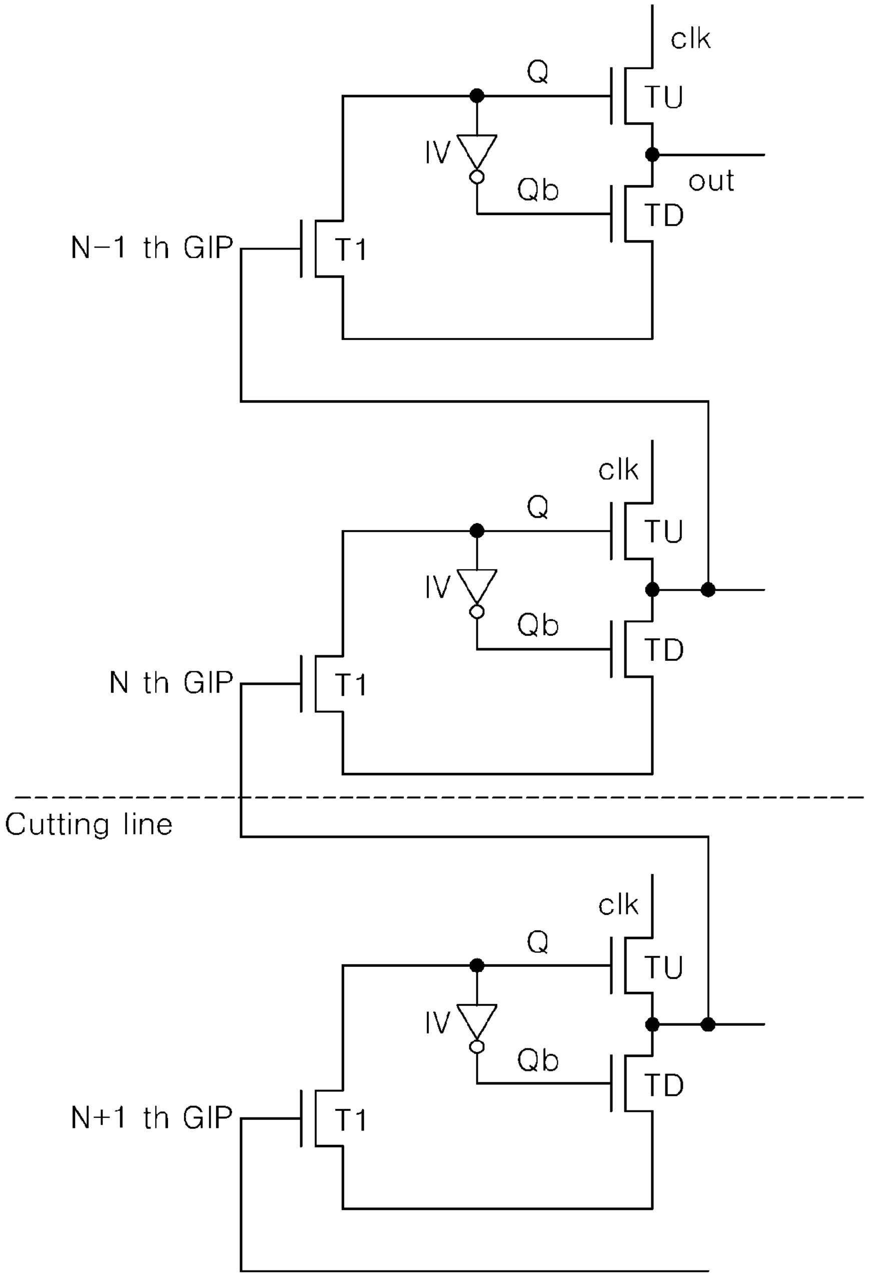
FIG. 2 shows a gate driving circuit that is applied to a cutable display panel according to a first embodiment.
Figure 3:
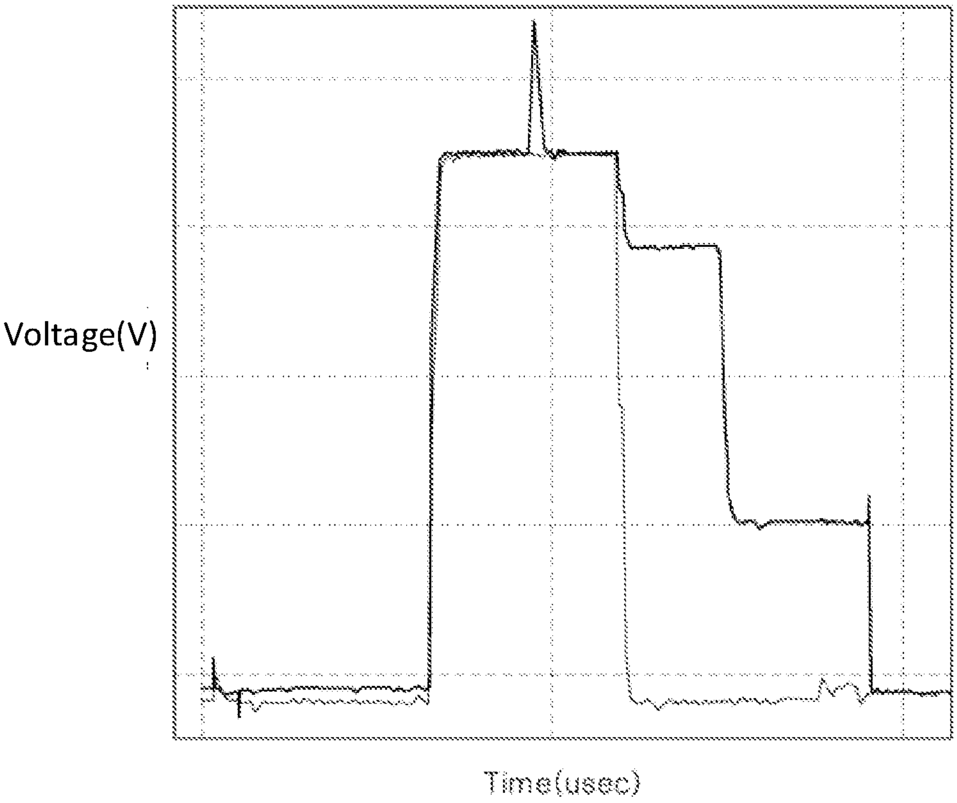
FIG. 3 is a waveform view to describe voltage distortion of a Q node due to leakage current.

FIG. 1 shows a gate driving circuit according to a first embodiment. FIG. 2 shows a gate driving circuit that is applied to a cutable display panel according to a first embodiment. FIG. 3 is a waveform view to describe voltage distortion of a Q node due to leakage current. For description sake, the gate driving circuit is shown as including three stages.

Referring to FIGS. 1 to 3, the gate driving circuit according to the first embodiment may include an N−1 stage, an N stage and an N+1 stage.

The gate driving circuit may be exemplified as a GIP gate driving circuit embedded in a display panel. The display panel may be a cutable transparent display panel that requires various sizes and shapes.

The gate driving circuit may be cut together with the display panel, when cutting the display panel. When cutting the display panel, it is exemplified that the gate driving circuit is cut between a N state and a N+1 stage, but the present disclosure is not limited thereto.

Each of the stages may include a pull-up transistor TU, a pull-down transistor TD and a first transistor T1.

A pull-up transistor TU of the N stage pull-up drives an output in response to a signal of a Q node. A pull-down transistor TD of the N state pull-down drives the output in response to a signal of a Qb node.

A first transistor T1 of the N stage is coupled to a Q node and a source electrode of a pull-down transistor TD, and pull-down drives the Q node in response to a signal from an output of an N+1 stage.

The pull-up transistor, the pull-down transistor TD and the first transistor T1 are designed in the N stage.

When cutting the display panel between the N stage and the N+1 stage, the N stage may output a distorted signal. For example, the N stage may include a first transistor T1 configured to reset a Q node in the N stage. However, a gate electrode of the first transistor T1 is floating by cutting. When the gate electrode of the first transistor T1 is floating, the first transistor T1 could be turned on and leakage current might flow in the first transistor T1 due to the floating of the gate electrode of the first transistor T1. When a gate signal is output due to the leakage current of the first transistor T1, the Q node could be discharged of charge. There might be a problem in that the N stage cannot output the gate signal at the desired timing due to the discharge of the Q node.

FIG. 3 is a waveform view to describe voltage distortion of a Q node due to leakage current. When the gate electrode of the first transistor T1 is floating in the N stage, the gate node is raised by the gate drain parasitic capacitor of the first transistor T1 during the Q node boosting. Accordingly, there could be a problem in that the voltage at the Q node is discharged as shown in FIG. 3. The voltage of the Q node must be maintained at a high level for a predetermined period of time when the Q node is boosted, but as shown in FIG. 3, the voltage of the Q node might be discharged by the leakage current of the first transistor T1. Such poor driving circuit might degrade image quality.

In the present disclosure, the gate driving circuit may be cut together with the display panel, when cutting the display panel. At this time, it is possible to prevent the driving failure caused by the Q node discharge of the last stage circuit.

Figure 4:
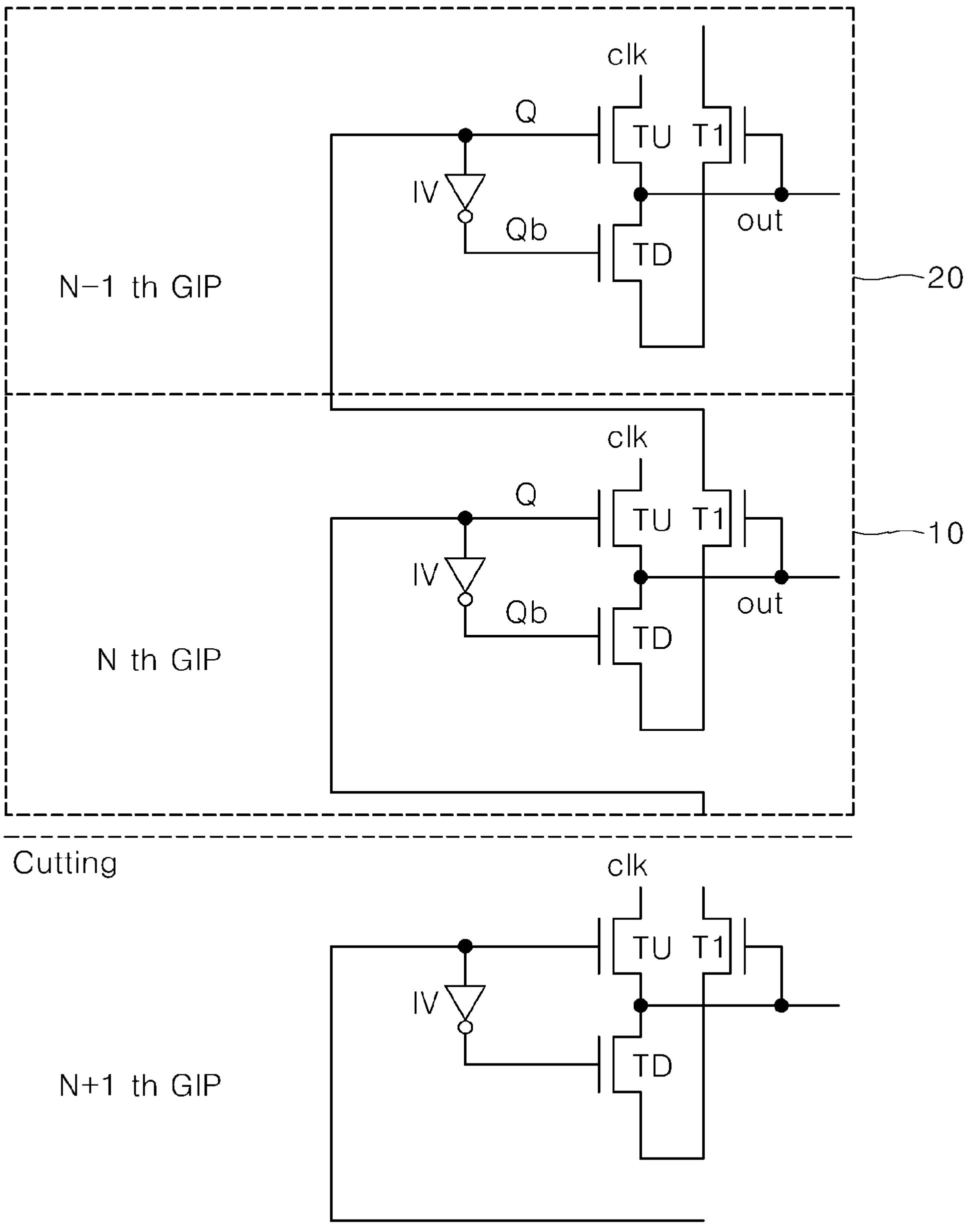
FIG. 4 shows a gate driving circuit that is applied to a cutable display panel according to a second embodiment.
Figure 5:
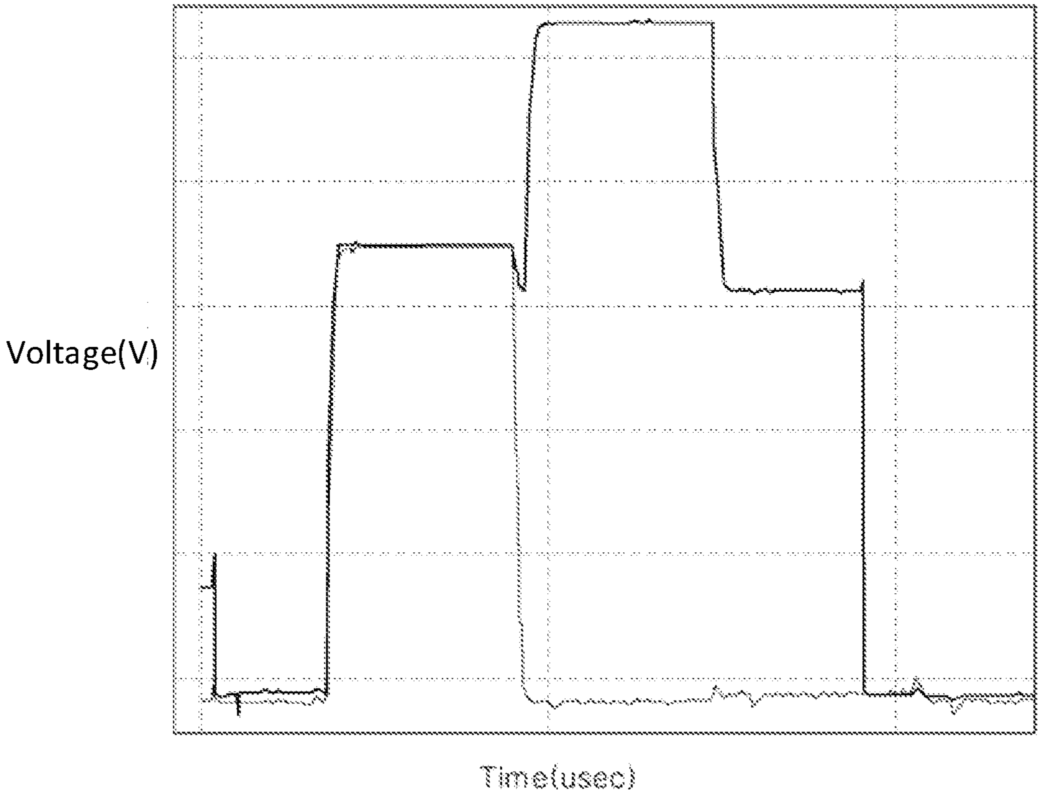
FIG. 5 shows a waveform of a Q node in the gate driving circuit of FIG. 4 according to one embodiment.

FIG. 4 shows a gate driving circuit that is applied to a cutable display panel according to a second embodiment. FIG. 5 shows a waveform of a Q node in the gate driving circuit of FIG. 4.

Referring to FIGS. 4 and 5, the gate driving circuit according to the second embodiment may include a plurality of stages. Each of the plurality of stages may include a pull-up transistor TU, a pull-down transistor TD, a first transistor T1 and an inverter IV.

A pull-up transistor TU of the N stage 10 pull-up drives an output stage in response to a signal of a Q node. A source electrode of the pull-up transistor TU is coupled to a clock line to which a clock signal clk is applied.

A pull-down transistor TD of the N stage 10 pull-down drives an output stage in response to a signal of Qb node of the N stage 10. A source electrode of the pull-down transistor TD is coupled to a ground voltage line to which a ground voltage GVSS is applied.

A first transistor T1 of the N stage is coupled between a source electrode of the pull-down transistor TD of the N stage 10 and a Q node of the N−1 stage 20, and pull-down drives a Q node of the N−1 stage 20 in response to a signal of an output stage of the N stage 10. The source electrode of the first transistor T1 is coupled to a ground voltage line to which a ground voltage GVSS is applied.

The first transistor T1 discharges the Q node of the N−1 stage 20 to the ground voltage GVSS in response to the signal of the output terminal of the N stage 10.

The inverter IV is coupled between the Q node and the Qb node, and inverts a signal of the Q node to output the inverted signal to the Qb node.

In the gate driving circuit according to the second embodiment, the first transistor T1 of the N−1 stage 20 is aligned in the N stage 10 and the first transistor T1 of the N stage 10 is aligned in the N+1 stage 10. When the display panel is cut, the first transistor T1 of the last N stage 10 is removed so that the discharge of the Q node of the N stage 10 may be prevented.

Since the electrode of the pull-up transistor TU of the N stage 10 is opened by cutting, the charge at the Q node is not discharged. Meanwhile, the last N stage 10 by the cutting may be used as a dummy stage for resetting the N−1 stage 20.

As described above, it is possible to prevent or at least reduce the discharge at the Q node due to the leakage current in the last stage when cutting the panel. accordingly, the distortion of the gate signal may be prevented and output stability of the gate driving circuit may be secured.

Figure 6:
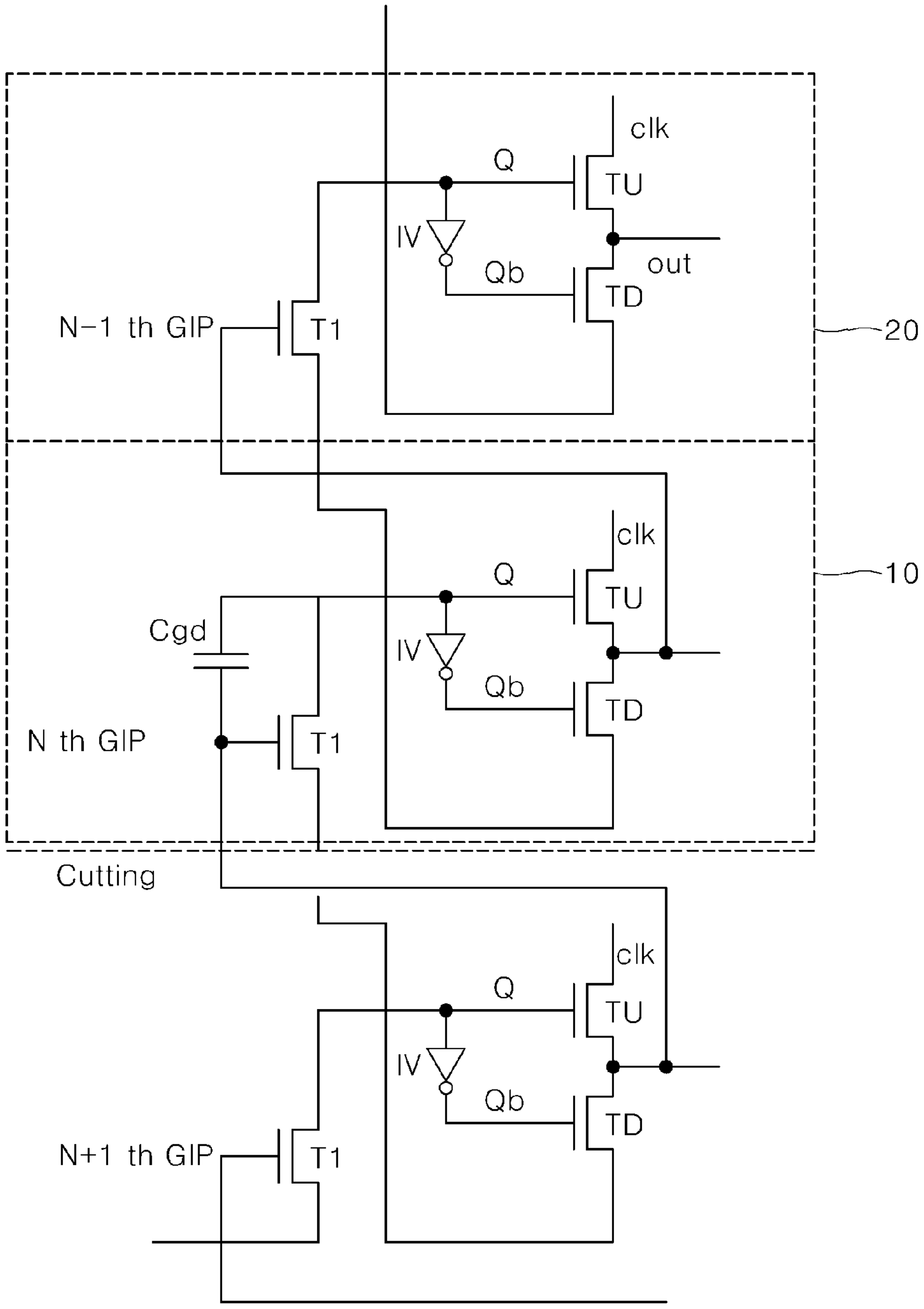
FIG. 6 shows a gate driving circuit that is applied to a cutable display panel according to a third embodiment.

In addition, the output of the last stage is stable. This stability of the output at the last stage can contribute to a narrow bezel at the bottom of the display panel. If the last stage is not output, the bezel should cover up to the N−1 stage. However, since the output of the last stage is stable, the N−1 stage need not be covered so the bezel at the lower end may be narrow. FIG. 6 shows a gate driving circuit that is applied to a cutable display panel according to a third embodiment.

Referring to FIG. 6, the gate driving circuit according to the third embodiment may include a plurality of stages. Each of the plurality of stages may include a pull-up transistor TU, a pull-down transistor TD, a first transistor T1 and an inverter IV.

A pull-up transistor TU of a N−1 stage 20 pull-up drives an output terminal in response to a signal at a Q node of the N−1 stage 20. A source electrode of the pull-up transistor TU is coupled to a clock line to which a clock signal clk is applied.

A pull-down transistor TD of the N−1 stage 20 pull-down drives an output terminal in response to a signal at a Qb node of the N−1 stage 20. A source electrode of the pull-down transistor TD is coupled to a ground voltage line to which a ground voltage GVSS is applied.

A first transistor T1 of the N−1 stage 20 is coupled between the Q node of the N−1 stage 20 and the source electrode of the pull-down transistor TD of the N stage 10, and pull-down drives the Q node of the N−1 stage 20 in response to a signal of an output terminal of the N stage. A source electrode of the first transistor T1 is coupled to a ground voltage line to which a ground voltage GVSS is applied.

The inverter IV is coupled between the Q node and the Qb node, and inverts a signal of the Q node to output the inverted signal to the Qb node.

The gate driving circuit according to the third embodiment couples the source electrode of the first transistor T1 of the N stage 10 to a source electrode of a pull-down transistor TD of a N+1 stage. Accordingly, in the cutting, both the source electrode and the gate electrode of the first transistor T1 of the N stage 10 are opened.

When the Q node of the N stage 10 rises, the voltage at the gate electrode of the first transistor T1 rises. However, the source electrode is open, so the Q node is not discharged.

As described above, the discharge of the Q node due to the leakage current is prevented or at least reduced in the last stage when the display panel is cut, thereby preventing or at least reducing the distortion of the gate signal and then securing the output stability of the gate driving circuit.

Figure 7:
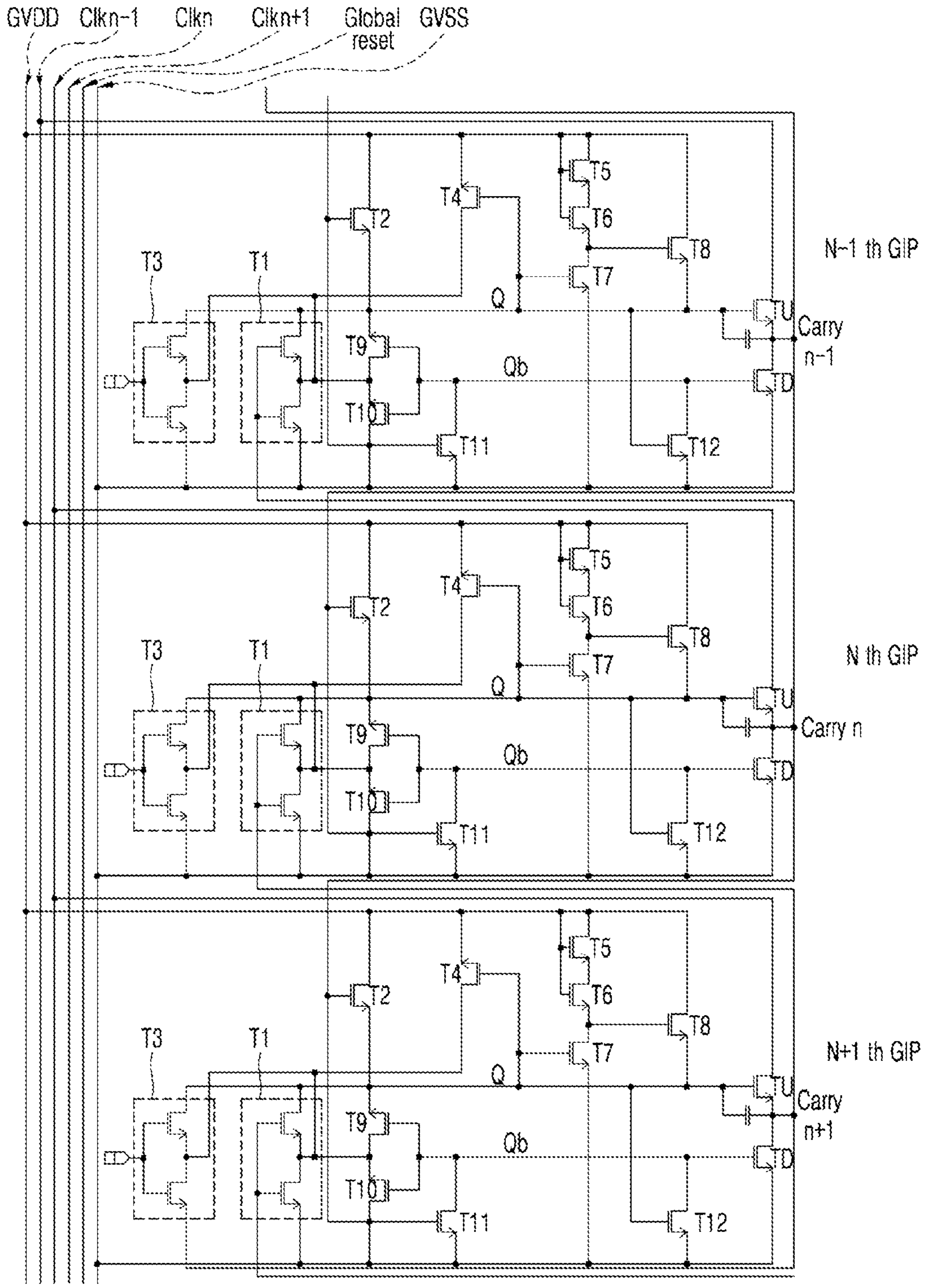
FIG. 7 shows an overall circuit of the gate driving circuit according to the first embodiment.
Figure 10:
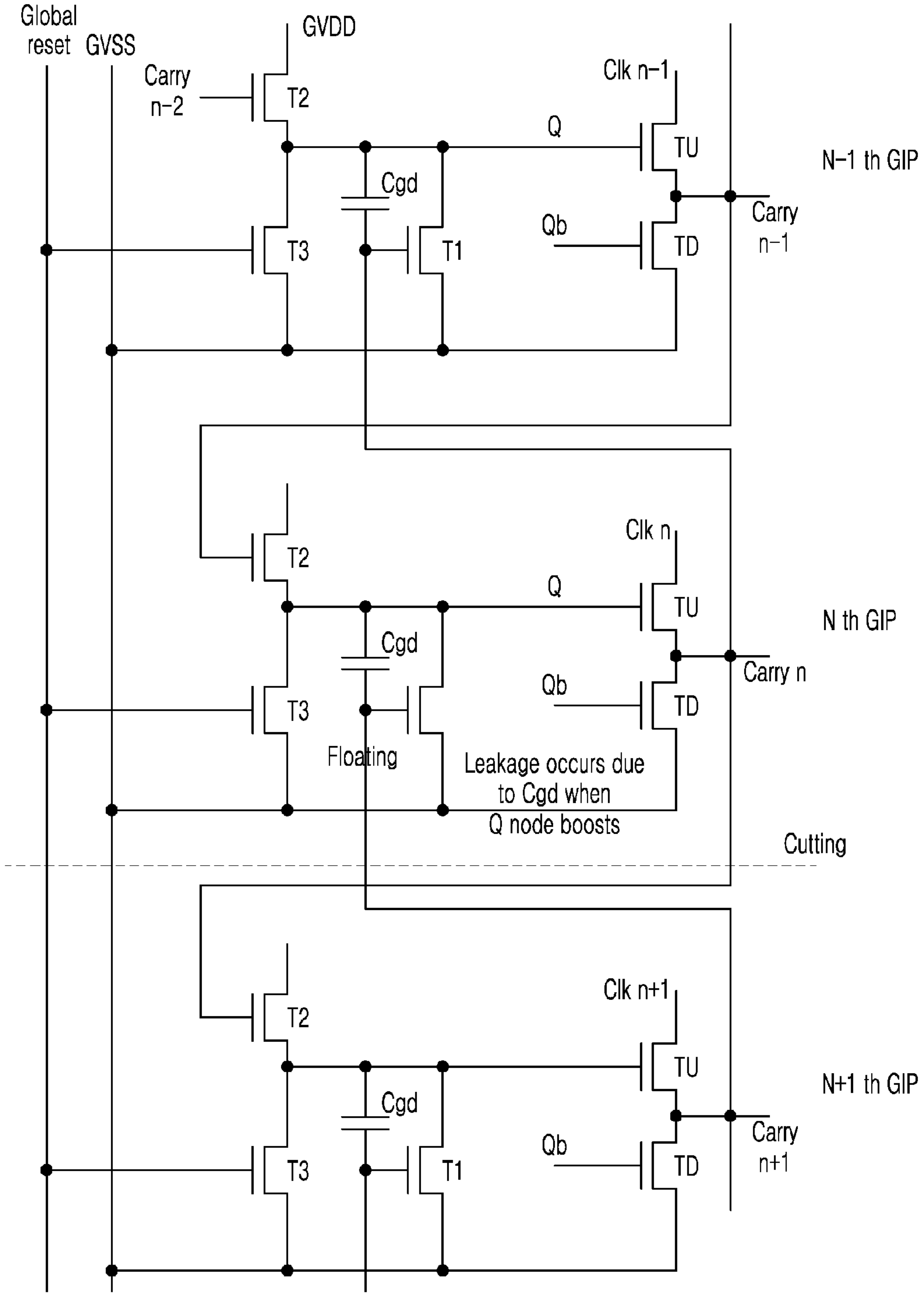
FIG. 10 is a circuit view to describe discharge at a Q node due to leakage current in the gate driving circuit according to the first embodiment.
Figure 11:
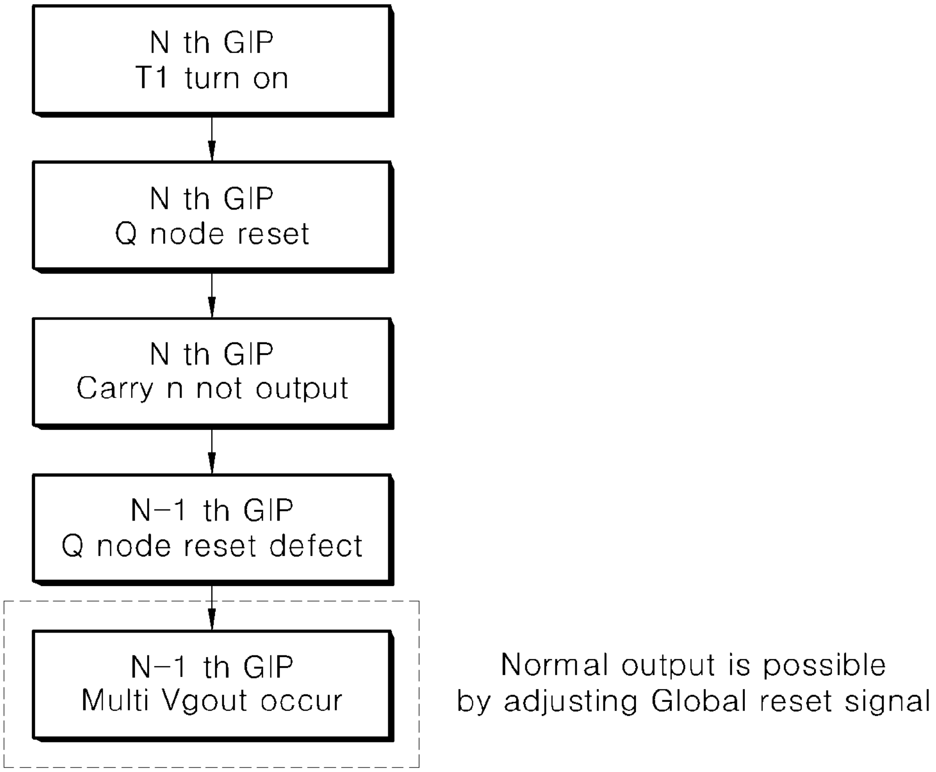
FIG. 11 is a flow chart to describe an operation of the gate driving circuit according to the first embodiment.

FIG. 7 shows an overall circuit of the gate driving circuit according to the first embodiment. FIG. 10 is a circuit view to describe discharge at a Q node due to leakage current in the gate driving circuit according to the first embodiment. FIG. 11 is a flow chart to describe an operation of the gate driving circuit according to the first embodiment;

Referring to FIGS. 7, 10 and 11, the gate driving circuit according to the first embodiment may include the plurality of stages. Each of the plurality of stages may include a pull-up transistor TU, a pull-down transistor TD, a first transistor T1, a second transistor T2 and a third transistor T3.

The pull-up transistor TU of each stage pull-up drives an output terminal in response to a signal of the Q node. A source electrode of the pull-up transistor TU is coupled to a clock line of each stage. A corresponding clock signal among Clkn−1, Clkn and Clkn+1 is applied to the clock line of each stage.

The pull-down transistor TD of each stage pull-down drives an output terminal in response to a signal of the Qb node. A source electrode of the pull-down transistor TD is coupled to a ground voltage line to which a ground voltage GVSS is applied.

The first transistor T1 of each stage is coupled between the Q node and the ground voltage GVSS, and pull-down drives the Q node of its own stage in response to a signal of an output end of the next stage. For example, the first transistor T1 may include two transistors serially connected between the Q node and the ground voltage GVSS and driving in response to a carry signal of an output terminal of the next stage.

The second transistor T2 of each stage pull-up drives a Q node of its own stage in response to a signal of an output of the previous stage. A source of the second transistor T2 is coupled to a power voltage line to which a power voltage GVDD is applied. The second transistor T2 of each stage receives a signal of an output terminal of the previous stage as a carry single and pull-up drives a Q node of its own stage with the power voltage GVDD.

The third transistor T3 of each stage is coupled to a drain electrode of the second transistor T2, and pull-down drives a Q node of its own stage in response to a global reset signal. A source electrode of the third transistor T3 of each stage is coupled to a ground voltage line to which a ground voltage GVSS is applied. As one example, the third transistor T3 may include two transistors serially connected between the Q node and the ground voltage GVSS and driving in response to a global reset signal.

In case of performing the cutting between the N stage and the N+1 stage, the first transistor T1 of the N stage may be turned on due to a gate-drain parasitic capacitor when the Q node is boosted. The Q node may be discharged of voltages by the turn-on of the first transistor T1. Due to the voltage discharge at the Q node, a driving failure might occur in the N stage in which the gate signal cannot be output.

The gate signal output from the N stage may be output to the Nth gate line of the display panel and used as a scan signal to scan the pixel. In addition, the gate signal output from the N stage may be output to the N−1 stage and used as a reset signal to reset the Q node of the N−1 stage. However, if the N stage cannot output a gate signal due to the voltage discharge of the Q node, a driving defect might occur in which the Q node of the N−1 stage is not reset. Due to the driving defect of not resetting the Q node of the N−1 stage, a gate signal output from the N−1 stage may be defective. For example, a defect in that the N−1 stage outputs the gate signal as a multi signal might occur. The defect of outputting the gate signal as the multi signal may be prevented or at least reduced by adjusting the global reset signal.

The third transistor T3 of each stage resets the source electrode of the first transistor T1 to the ground voltage GVSS in response to the global signal Global, thereby prevent a defect of outputting multi gate signals.

The gate driving circuit according to the first embodiment may further include a fourth transistor T4, a fifth transistor T5, a sixth transistor T6, a seventh transistor T7, an eighth transistor T8, a capacitor, a ninth transistor T9, a tenth transistor T10, an eleventh transistor T11 and a twelfth transistor T12 at each stage.

The fourth transistor T4 of each stage is coupled between nodes of transistors of the power voltage GVDD and the third transistor T3 serially connected with each other. The fourth transistor T4 is coupled between nodes between transistors of the power voltage GVDD and the first transistor T1 serially connected with each other. The fourth transistor T4 is coupled between the power voltage GVDD and a node between the ninth transistor Y9 and the tenth transistor T10. The fourth transistor T4 drives in response to a signal of the Q node.

The fifth transistor T5, the sixth transistor T5 and the seventh transistor T7 of each stage are coupled between the power voltage GVDD and the ground voltage GVSS. The fifth transistor T5 and the sixth transistor T6 drives in response to the power voltage GVDD, and the seventh transistor T7 drives in response to a signal of the Q node.

The eighth transistor T8 of each stage is coupled between the power voltage GVDD and the Q node. The eighth transistor T8 drives in response to a node between the sixth transistor T6 and the seventh transistor T7.

The capacitor of each stage is coupled between the Q node and an output terminal which is a node between the pull-up transistor TU and the pull-down transistor TD.

The ninth transistor T9 and the tenth transistor T10 of each stage are coupled between the Q node and the ground voltage GVSS. The ninth transistor T9 and the tenth transistor T10 drive in response to a signal of the Qb node.

The eleventh transistor T11 of each stage is coupled between the Qb node and the ground voltage GVSS. The eleventh transistor T11 pull-down drives in response to a carry signal of the previous stage.

The twelfth transistor T12 of each stage is coupled between the Qb node and the ground voltage GVSS. The twelfth transistor T12 pull-down drives in response to a signal of the Q node.

Figure 8:
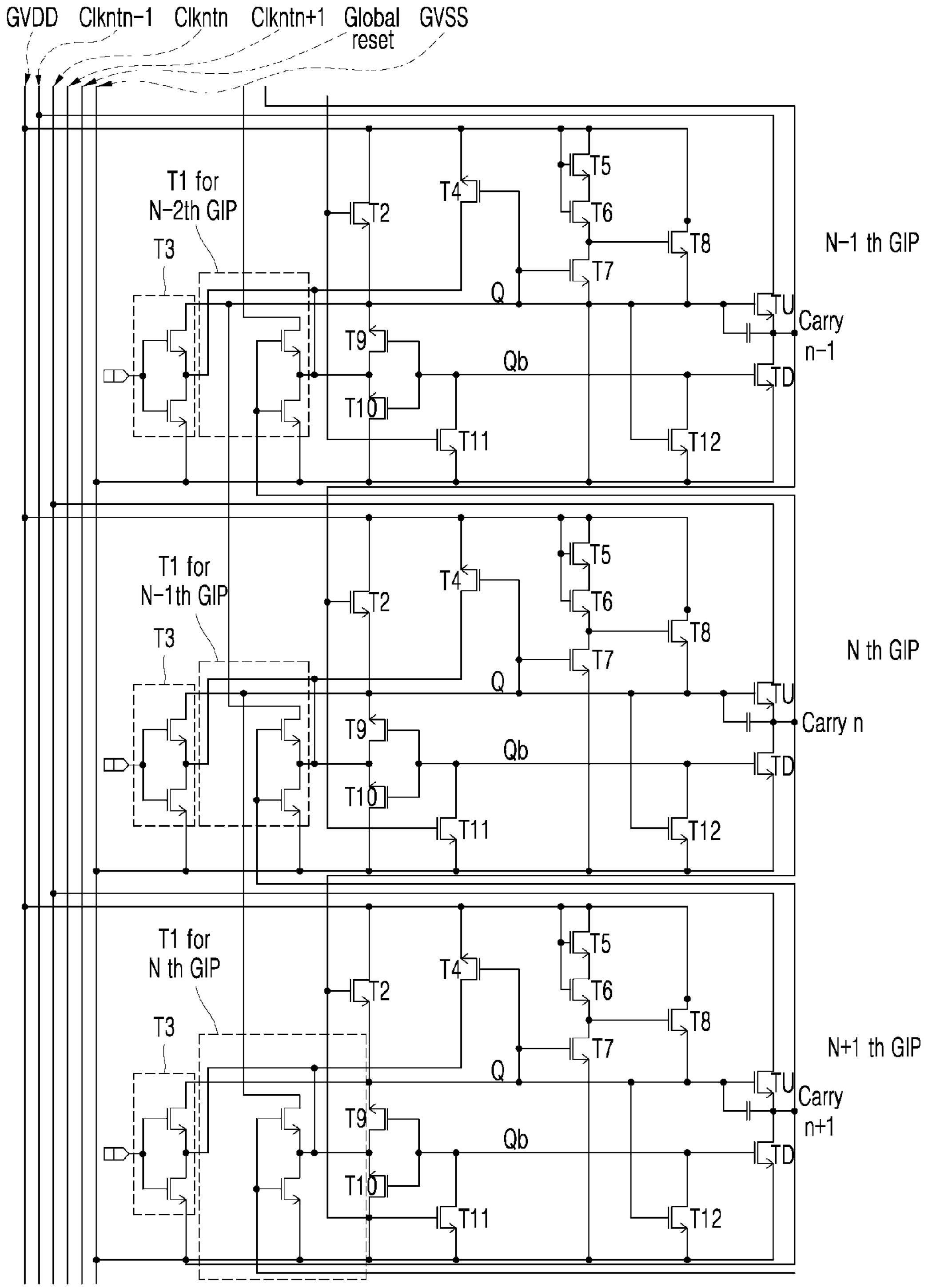
FIG. 8 shows an entire circuit of the gate driving circuit according to the second embodiment.
Figure 12:
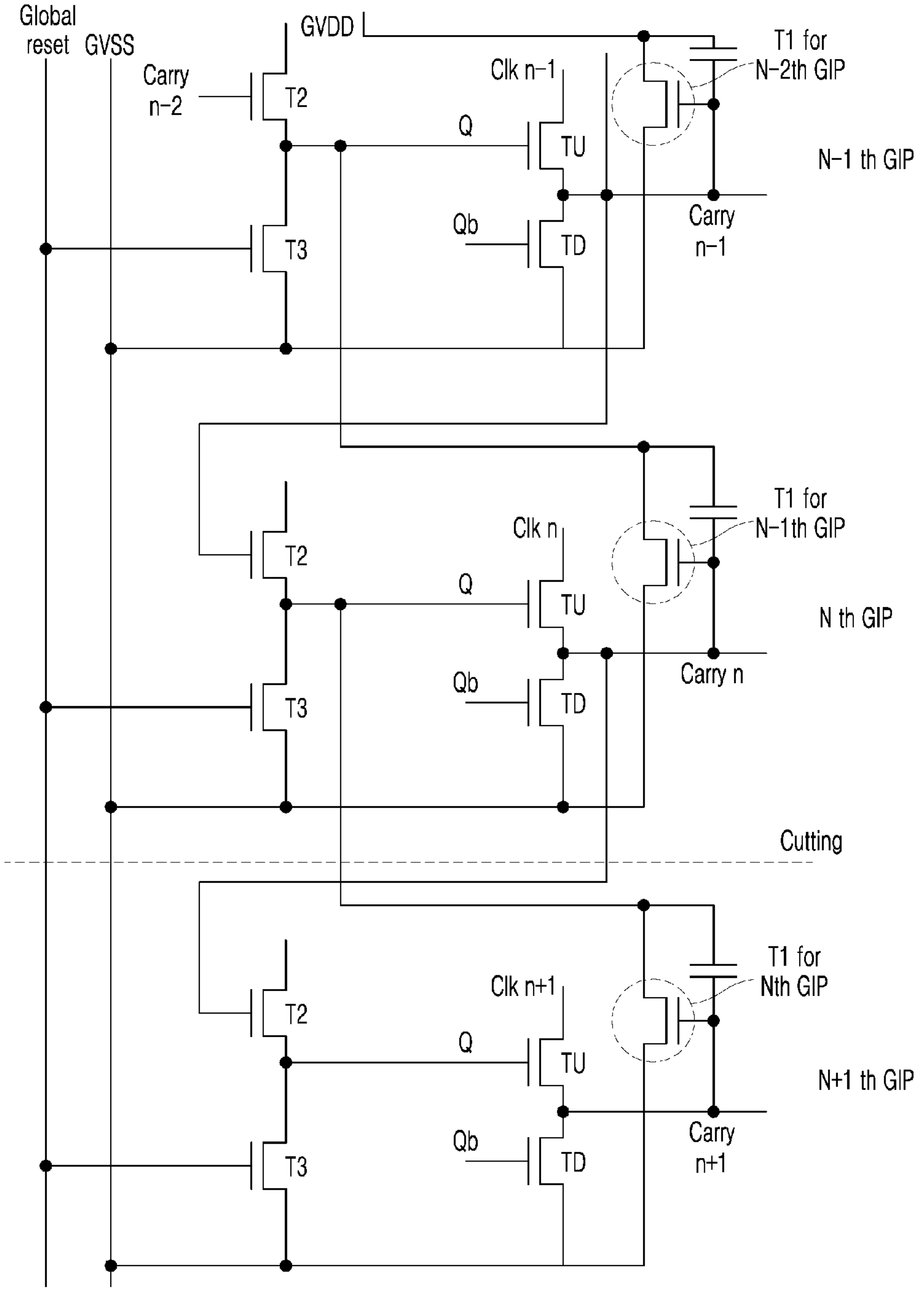
FIG. 12 is a circuit view to describe an operation of the gate driving circuit according to the second embodiment.
Figure 13:
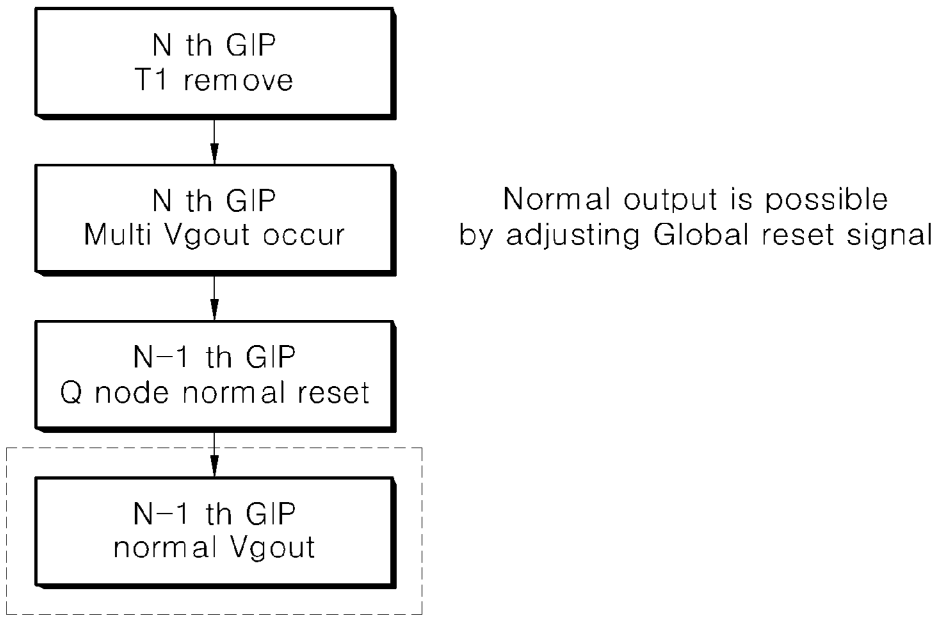
FIG. 13 is a flow chart to describe the operation of the gate driving circuit according to the second embodiment.

FIG. 8 shows an entire circuit of the gate driving circuit according to the second embodiment. FIG. 12 is a circuit view to describe an operation of the gate driving circuit according to the second embodiment. FIG. 13 is a flow chart to describe the operation of the gate driving circuit according to the second embodiment.

Referring to FIGS. 8, 12 and 13, the gate driving circuit according to the second embodiment includes a plurality of stages. Each of the plurality of stages may include a pull-up transistor TU, a pull-down transistor TD, a first transistor T1, a second transistor T2 and a third transistor T3.

The pull-up transistor TU of each stage pull-up drives an output terminal in response to a signal of a Q node. A source electrode of the pull-up transistor TU is coupled to a clock line corresponding to each stage. One of a clock signal Clkn−1, a clock signal Clkn and a clock signal Clkn+1 is applied to the clock line.

The pull-down transistor TD of each stage pull-down drives an output terminal in response to a signal of the Qb node. A source electrode of the pull-down transistor TD is coupled to a ground voltage line to which a ground voltage GVSS is applied.

The first transistor T1 of each stage is coupled between the source electrode of the pull-down transistor TD and a Q node of the previous stage, and pull-down drives a Q node of the previous stage in response to a signal of an output terminal of the next stage. The source electrode of the first transistor T1 is coupled to a ground voltage line to which a ground voltage GVSS is applied. The first transistor T1 discharges the Q node of the previous stage with the ground voltage GVSS. For example, the first transistor T1 may include two transistors serially connected between the Q node of the previous stage and the ground voltage GVSS, and pull-down driving the Q node of the previous stage in response to a carry signal of an output terminal of the next stage.

The second transistor T2 of each stage pull-up drives a Q node of its own stage in response to a signal of an output terminal of the previous stage. A source electrode of the second transistor T2 is coupled to a power voltage line to which a power voltage GVDD is applied. The second transistor T2 receives a signal of an output terminal of the previous stage as a carry signal and then pull-up drives the Q node of its own stage with the power voltage GVDD.

The third transistor T3 of each stage may be coupled to a drain electrode of the second transistor T2, and pull-down drive a Q node of its own stage in response to a global reset signal. A source electrode of the third transistor T3 may be coupled to a ground voltage line to which a ground voltage GVSS is applied. The third transistor T3 may pull-down drive the Q node with the ground voltage GVSS in response to the global reset signal. For example, the third transistor T3 may include two transistors serially connected between the Q node and the ground voltage GVSS, and driving in response to a global reset signal.

In the gate driving circuit according to a second embodiment, the first transistor T1 of each stage may be disposed in the next stage. For example, the first transistor T1 of the N−1 stage may be disposed in the N stage and the first transistor T1 of the N stage may be disposed in the N+1 stage. For example, when cutting is performed between the N stage and the N+1 stage, the first transistor T1 of the N stage is removed, thereby preventing discharge of the Q node of the N stage due to the leakage current of the first transistor T1. Since the Q node of the pull-up transistor TU of the N stage is not discharged, the driving defect might not occur.

Through this, distortion of the gate signal may be prevented or at least reduced and output stability may be prevented. In addition, leakage current of the gate driving circuit may be prevented to reduce power consumption and drive the display panel with low power.

In addition, the third transistor T3 of each stage may perform pull-down driving of the Q node in response to a global reset signal. When the N stage cannot output a gate signal due to the voltage discharge of the Q node, a driving defect in that the Q node of the N−1 stage is not reset might occur. Such a driving defect in that the Q node of the N−1 is not reset could cause a defect in that the N−1 stage outputs a gate signal as a multi signal. The third transistor T3 of each stage according to this embodiment may reset the Q node to a ground voltage GVSS in response to the global reset signal. Even when the N−1 stage does not receive the gate signal used as the reset signal from the N stage, the Q node of the N−1 stage may be reset by the global reset signal, thereby prevent the defect of outputting the gate signal as the multi-signal. In this way, each stage may normally reset the Q node in response to the global reset signal so that it may normally output a normal the gate signal having a signal pulse.

In addition, the gate driving circuit according to the second embodiment may further include a fourth transistor T4, a fifth transistor T5, a sixth transistor T6, a seventh transistor T7, an eighth transistor T8, a ninth transistor T9, a tenth transistor T10, an eleventh transistor T11 and a twelfth transistor T12 at each stage. The fourth transistor T4 of each state may be coupled between a power voltage GVDD and a node between the serially connected transistors of the third transistor T3. The fourth transistor T4 is coupled between the power voltage GVDD and a node between the serially connected transistors of the fourth transistor T4. The fourth transistor T4 is coupled between the power voltage GVDD and a node between the serially connected transistors of the first transistor T1. The fourth transistor T4 is coupled between the power voltage GVDD and a node between the ninth transistor T9 and the tenth transistor T10. The fourth transistor T4 drives in response to a signal of a Q node.

The fifth transistor T5, the sixth transistor T6 and the seventh transistor T7 of each stage are coupled between the power voltage GVDD and a ground voltage GVSS. The fifth transistor T5 and the sixth transistor T6 drive in response to the power voltage GVDD, and the seventh transistor T7 drives in response to a signal of the Q node.

The eighth transistor T8 of each stage is coupled between the power voltage GVD and the Q node. The eighth transistor T8 drives in response to a node between the sixth transistor T6 and the seventh transistor T7.

The capacitor of each stage is coupled between the Q node and an output terminal which is a node between the pull-up transistor TU and the pull-down transistor TD.

The ninth transistor T9 and the tenth transistor T10 of each stage is coupled between the Q node and a ground voltage GVSS. The ninth transistor T9 and the tenth transistor T10 drives in response to a signal of the Qb node.

The eleventh transistor T11 of each stage is coupled between the Qb node and the ground voltage GVSS. The eleventh transistor T11 pull-down drives the Qb node in response to a carry signal of the previous stage.

The twelfth transistor of each stage is coupled between the Qb node and the ground voltage GVSS. The twelfth transistor T12 pull-down drives in response to a signal of the Q node.

Figure 9:
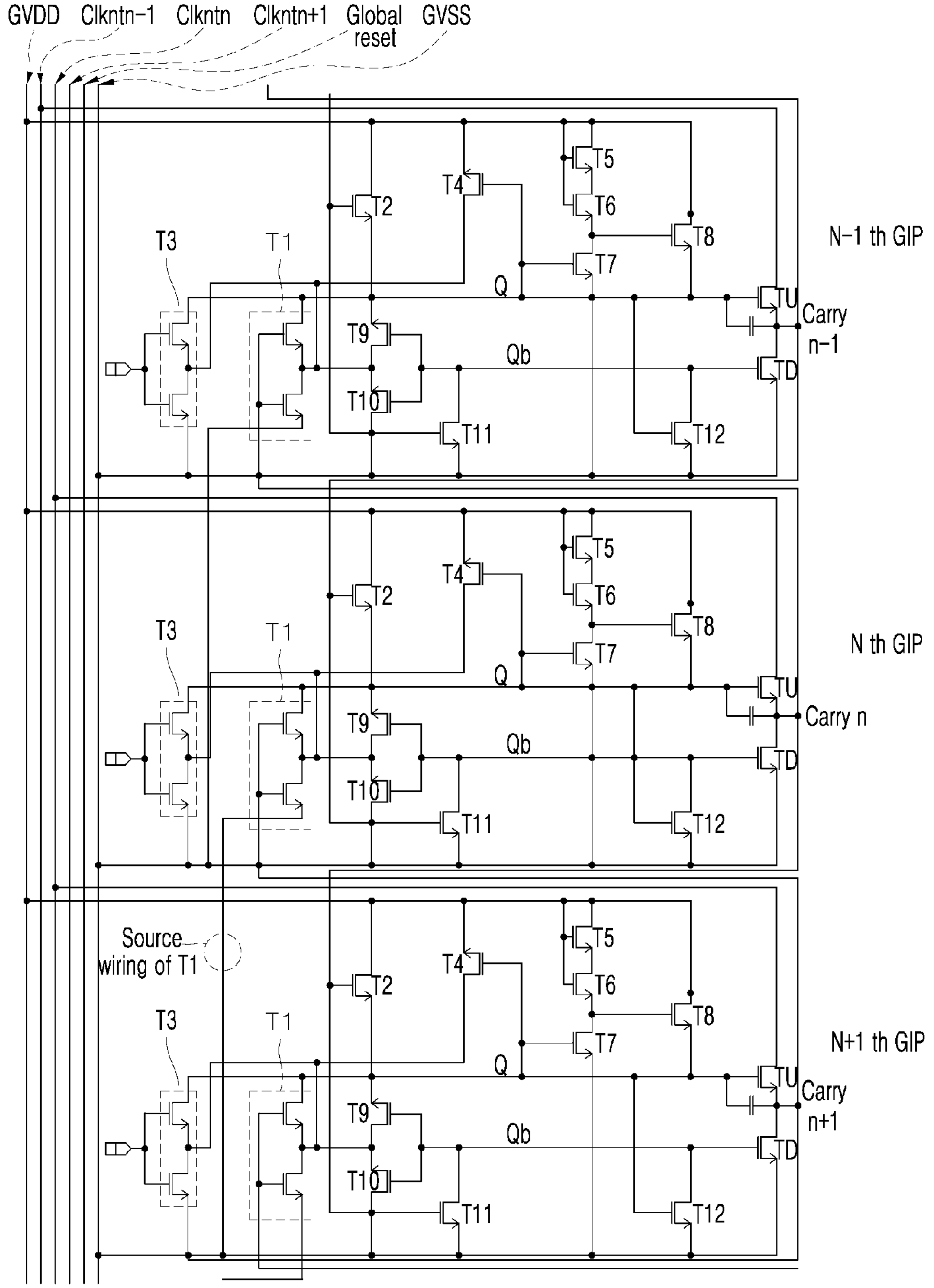
FIG. 9 shows an entire circuit of the gate driving circuit according to the third embodiment.
Figure 14:
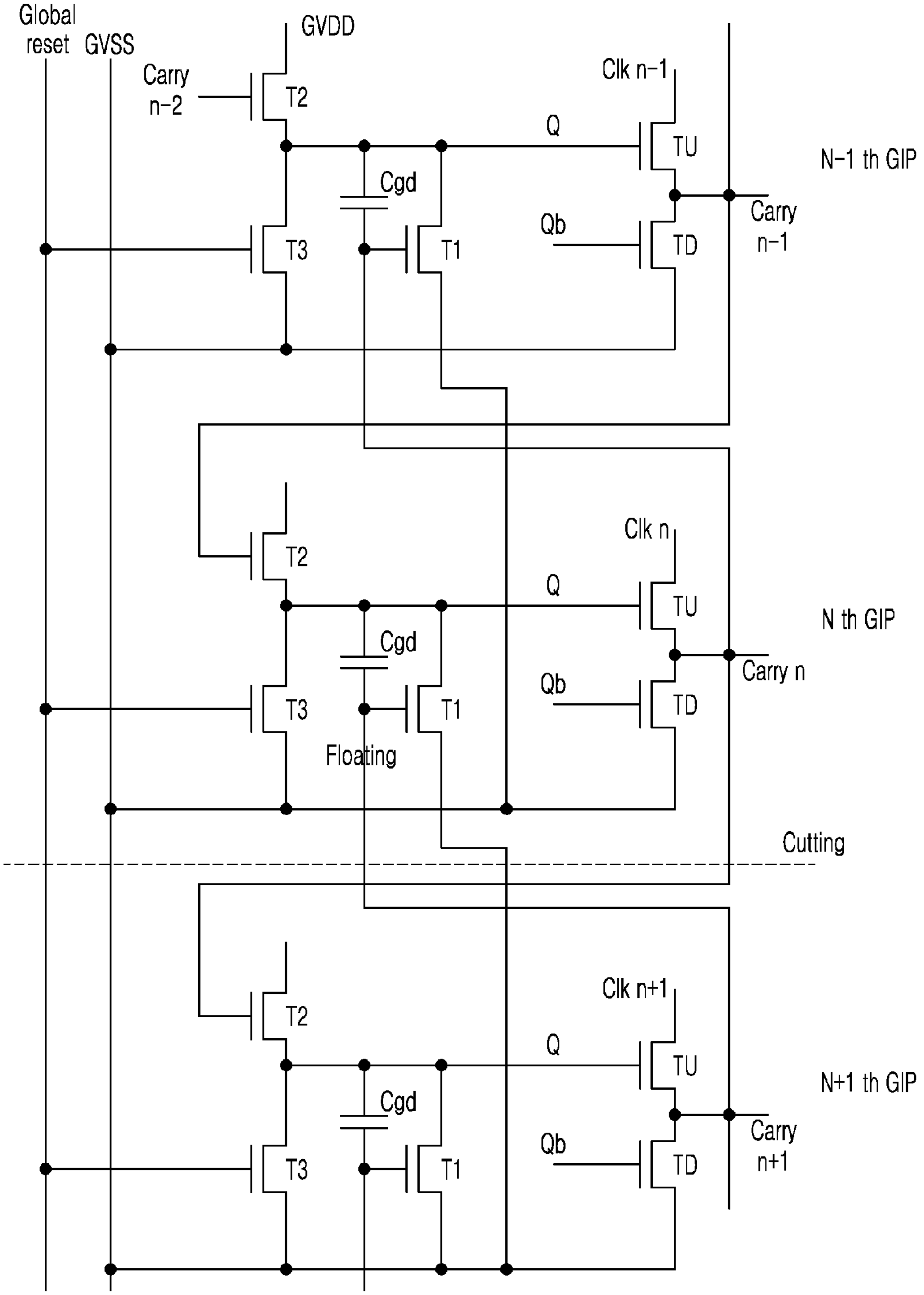
FIG. 14 is a circuit view to describe an operation of the gate driving circuit according to the third embodiment.
Figure 15:
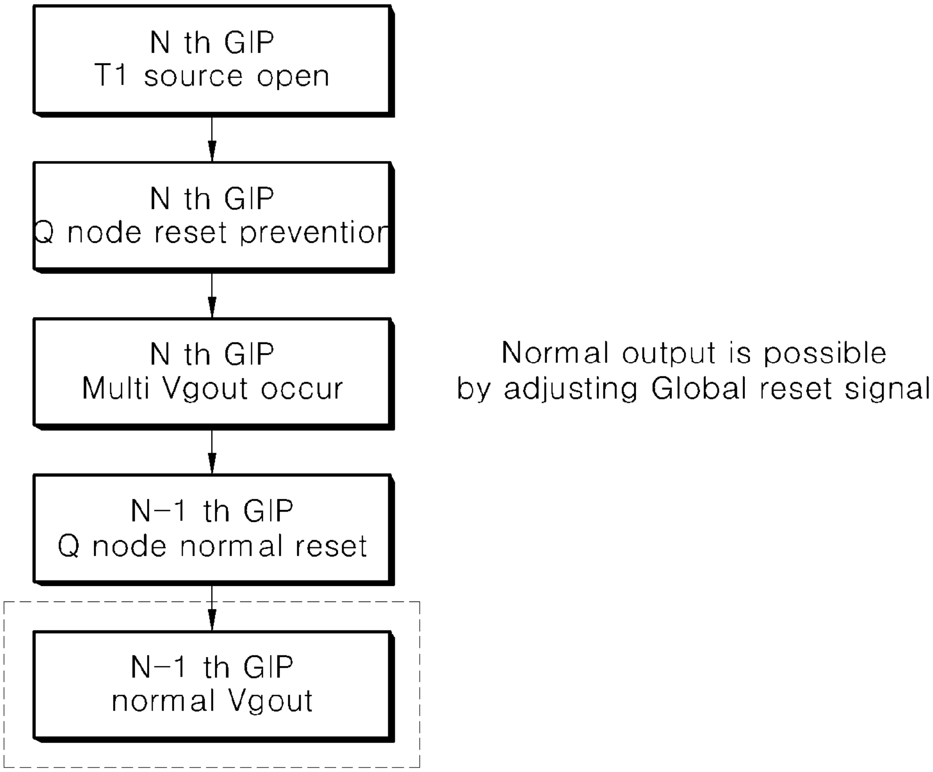
FIG. 15 is a flow chart to describe the operation of the gate driving circuit according to the third embodiment.

FIG. 9 shows an entire circuit of the gate driving circuit according to the third embodiment. FIG. 14 is a circuit view to describe an operation of the gate driving circuit according to the third embodiment. FIG. 15 is a flow chart to describe the operation of the gate driving circuit according to the third embodiment.

Referring to FIGS. 9, 14 and 15, the gate driving circuit according to the third embodiment may include a plurality of stages. Each of the plurality of stages includes a pull-up transistor TU, a pull-down transistor TD, a first transistor T1, a second transistor T2 and a third transistor T3.

The pull-up transistor TU of each stage pull-up drives an output terminal in response to a signal of the Q node. A source electrode of the pull-up transistor TU is coupled to a clock line corresponding to each stage. One of a clock signal Clkn−1, a clock signal Clkn and a clock signal Clkn+1 is applied to the clock line.

The pull-down transistor TD of each stage pull-down drives an output terminal in response to a signal of the Qb node. A source electrode of the pull-down transistor TD is coupled to a ground voltage line to which a ground voltage GVSS is applied.

The first transistor T1 of each stage is coupled between a Q node of its own stage and a source electrode of the pull-down transistor TD of the next stage, and pull-down drives the Q node of its own stage in response to a signal of an output terminal of the next stage. A source electrode of the first transistor T1 is coupled to a ground voltage line to which a ground voltage GVSS is applied. As one example, the first transistor T1 may include two transistors serially connected between a Q node of its own stage and a source electrode of the pull-down transistor of the next stage, and pull-down driving the Q node of its own stage in response to a carry signal of an output terminal of the next stage.

The second transistor T2 of each stage pull-up drives a Q node of its own stage in response to a signal of an output terminal of the previous stage. A source electrode of the second transistor T2 is coupled to a power voltage line to which a power voltage GVDD is applied. The second transistor T2 receives a signal of the output terminal of the previous stage as a carry signal and pull-up drives the Q node of its own stage with the power voltage GVDD.

The third transistor T3 of each stage is coupled between a Q node and a ground voltage and pull-down drives the Q node in response to a global reset signal. A source electrode of the third transistor T3 is coupled to a ground voltage line to which a ground voltage GVSS is applied. The third transistor T3 pull-down drives the Q node in response to a global reset signal. As one example, the third transistor T3 may include two transistors serially connected between the Q node and the ground voltage GVSS and driving in response to the global reset signal. A source electrode of the first transistor T1 of each stage is coupled to a ground voltage line coupled to a source electrode of a pull-down transistor T1 of the next stage so that a source electrode and a gate electrode of the first transistor T1 of the last stage are open when cutting is performed.

When a Q node of the last stage rises, the voltage of a gate electrode of the first transistor T1 rises. However, since the source electrode open, the Q node is not discharged. The discharge of the Q node due to leakage current in the last stage may be prevented.

Accordingly, distortion of the gate signal may be prevented and the output stability of the gate driving circuit may be secured. In addition, the leakage current of the gate driving circuit may be prevented. Accordingly, power consumption may be reduced and the display panel may drive with low power.

The third transistor T3 of the last stage full-down drives a Q node with a ground GVSS in response to a global reset signal, so it is possible to prevent a defect in that the last stage outputs a gate signal as a multi signal. The last stage may normally output the gate signal by normally resetting the Q node.

In addition, the gate driving circuit according to the third embodiment may further include a fourth transistor T4, a fifth transistor T5, a sixth transistor T6, a seventh transistor T7, an eighth transistor T8, a ninth transistor T9, a tenth transistor T10, an eleventh transistor T11 and a twelfth transistor T12 at each stage. The fourth transistor T4 of each stage is coupled between a power voltage GVDD and a node between serially connected transistors of the third transistor T3. The fourth transistor T4 is coupled between a power voltage GVDD and a node between serially connected transistors of the first transistor T3. The fourth transistor T4 is coupled between a power voltage GVDD and a node between the ninth transistor T9 and the tenth transistor T10. The fourth transistor T4 drives in response to a signal of a Q node.

The fifth transistor T5, the sixth transistor T6 and the seventh transistor T7 of each stage are coupled between a power voltage GVDD and a ground voltage GVSS. The fifth transistor T5 and the sixth transistor T6 drives in response to the power voltage GVDD, and the seventh transistor T7 drives in response to a signal of the Q node.

The eighth transistor T8 of each stage is coupled between a power voltage GVDD and a Q node. The eighth transistor T8 drives in response to a signal of a node between the sixth transistor T6 and the seventh transistor T7.

The capacitor of each stage is coupled between the Q node and an output terminal that is a node between the pull-up transistor TU and the pull-down transistor TD.

The ninth transistor T9 and the tenth transistor T10 of each stage is coupled between the Q node and the ground voltage GVSS. The ninth transistor T9 and the tenth transistor T10 drive in response to a signal of a Qb node.

The eleventh transistor T11 of each stage is coupled between the Qb node and the ground voltage GVSS. The eleventh transistor T11 pull-down drives the Qb node in response to a carry signal of the previous stage.

The twelfth transistor T12 of each stage is coupled between the Qb node and the ground voltage GVSS. The twelfth transistor T12 pull-down drives the Qb node in response to a signal of the Q node.

As described above, the gate driving circuit according to an embodiment may include the plurality of stages driving the plurality of gate lines, respectively. each of the plurality of stages includes a pull-up transistor TU pull-up driving an output terminal in response to a signal of a Q node of the N stage 10; a pull-down transistor TD pull-down driving the output terminal in response to a signal of a Qb node; and a first transistor T1 coupled between a source electrode of the pull-down transistor TD and a Q node of the N−1 stage 20 and pull-down driving the Q node of the N−1 stage 20 in response to a signal of the output terminal of the N stage 10.

The gate driving circuit further includes an inverter IV coupled between the Q node and the Qb node of the N stage T1 and inverting a signal of the Q node to output the inverted signal to the Qb node.

The gate driving circuit may further include a second transistor T2 full-dup driving the Q node of the N stage 10 in response to a signal of an output terminal of the N−1 stage 20.

A source electrode of the second transistor T2 is coupled to a power voltage line to which a power voltage GVDD is applied.

The second transistor T2 receives a signal of the output terminal of the N−1 stage 20 as a carry signal and pull-up drives the Q node of the N stage 10 with the power voltage GVDD.

The gate driving circuit may further include a third transistor T3 coupled to a drain electrode of the second transistor T2 and pull-down driving the Q node of the N stage 10 in response to a global reset signal.

A source electrode of the third transistor T3 is coupled to a ground voltage line to which a ground voltage GVSS is applied.

A source of the pull-up transistor TU is coupled to a clock line to which a clock signal clk is applied.

A source electrode of the pull-down transistor TD is coupled to a ground voltage line to which a ground voltage GVSS is applied.

A source electrode of the first transistor T1 is coupled to the ground voltage line to which the ground voltage GVSS is applied.

The first transistor of the N stage 10 discharges the Q node of the N−1 stage 20 with the ground voltage GVSS in response to a signal of the output terminal of the N stage 10.

The gate driving circuit according to another embodiment of the present disclosure may include a plurality of stages driving gate lines of the display panel, respectively. Each of the plurality of stages may include a pull-up transistor TU pull-up driving an output terminal in response to a signal of a Q node of the N−1 stage 20; a pull-down transistor TD pull-down driving the output terminal in response to a signal of a Qb node of the N−1 stage; and a first transistor T1 coupled between the Q node of the N−1 stage 20 and a source electrode of the pull-down transistor TD of the N stage and pull-down driving the Q node of the N−1 stage 20 in response to the signal of the output terminal of the N stage.

The gate driving circuit may further include an inverter IV coupled between the Q node and the Qb node of the N−1 stage 20 and inverting and outputting a signal of the Q node to the Qb node.

The gate driving circuit may further include a second transistor T2 pull-up drives the Q node of the N−1 stage 20 in response to a signal of an output terminal of the N−2 stage.

A source electrode of the second transistor T2 is coupled to a power voltage line to which a power voltage GVDD is applied.

The gate driving circuit may include a third transistor T3 coupled to a drain electrode of the second transistor T2 and pull-down driving the Q node of the N−1 stage 20.

A source electrode of the third transistor T3 is coupled to a ground voltage line to which a ground voltage GVSS is applied.

A source electrode of the pull-up transistor TU is coupled to a clock line to which a clock signal clk is applied.

The source electrode of the pull-down transistor TD and the source electrode of the first transistor T1 are coupled to a ground voltage line to which a ground voltage GVSS is applied.

A display apparatus according to an embodiment may include a display panel and a gate driving circuit driving the display panel. The gate driving circuit may include a plurality of stages driving a plurality of gate lines. Each of the plurality of stages may include a pull-up transistor TU pull-up driving an output terminal in response to a signal of a Q node of a N stage; a pull-down transistor TD pull-down driving an output terminal in response to a signal of a Qb node of the N stage; and a first transistor T1 coupled between a source electrode of the pull-down transistor and a Q node of a N−1 stage and pull-down driving the Q node of the N−1 stage in response to a signal of the output terminal of the N stage.

A display apparatus according to another embodiment of the present disclosure may include a display panel; and a gate driving circuit driving the display panel. The gate driving circuit include a plurality of stages driving a plurality of gate lines. Each of the plurality of stages may include a pull-up transistor TU pull-up driving an output terminal in response to a signal of a Q node of N−1 stage; a pull-down transistor TD pull-down driving an output in response to a signal of a Qb node of the N−1 stage 20; and a first transistor T1 coupled between the Q node of the N−1 stage 20 and a source electrode of a pull-down transistor of a N stage, and pull-down driving the Q node of the N−1 stage 20 in response to a signal of an output terminal of the N stage 10.

As described above, according to the embodiments, the discharge of the Q node due to the leakage current in the last stage when the panel is cut may be prevented, thereby preventing distortion of the gate signal.

In addition, the distortion of the gate signal due to leakage may be prevented, thereby securing output stability.

In addition, the leakage current of the gate driving circuit may be prevented, thereby reducing power consumption.

In addition, the output of the last stage may be stable, thereby contributing a low bezel at a lower end of the display panel.

In addition, the power consumption may be reduced, thereby driving the display panel with low power.

Although the present invention has been described with reference to the exemplified drawings, it is to be understood that the present invention is not limited to the embodiments and drawings disclosed in this specification, and those skilled in the art will appreciate that various modifications are possible without departing from the scope and spirit of the present invention. Further, although the operating effects according to the configuration of the present invention are not explicitly described while describing an embodiment of the present invention, it should be appreciated that predictable effects are also to be recognized by the configuration.

NUMERAL REFERENCES

10: N stage 20: N−1 stage
IV: Inverter TU: Pull-up transistor
TD: Pull-down transistor T1: First transistor
T2: Second transistor T3: Third transistor

What is claimed is:

1. A gate driving circuit comprising:
a plurality of stages driving a plurality of gate lines, a N stage which is a last stage of the plurality of stages comprising:
a pull-up transistor configured to pull-up drive an output terminal in response to a signal of a Q node of the N stage;
a pull-down transistor configured to pull-down drive the output terminal in response to a signal of a Qb node of the N stage; and
a first transistor coupled between a source electrode of the pull-down transistor and a Q node of a N−1 stage, the first transistor configured to pull-down drive the Q node of the N−1 stage in response to a signal of the output terminal of the N stage,
wherein a gate electrode of the pull-up transistor is opened by cutting.

2. The gate driving circuit of claim 1, further comprising:
an inverter coupled between the Q node and the Qb node of the N stage, the inverter configured to invert a signal of the Q node and output the inverted signal to the Qb node.

3. The gate driving circuit of claim 1, further comprising:
a second transistor configured to pull-up drive the Q node of the N stage in response to a signal of an output terminal of the N−1 stage.

4. The gate driving circuit of claim 3, wherein a source electrode of the second transistor is coupled to a power voltage line to which a power voltage is applied.

5. The gate driving circuit of claim 4, wherein the second transistor receives a signal of the output terminal of the N−1 stage as a carry signal and is configured to pull-up drive the Q node of the N stage with the power voltage.

6. The gate driving circuit of claim 3, further comprising:
a third transistor coupled to a drain electrode of the second transistor and configured to pull-down drive the Q node of the N stage in response to a global reset signal.

7. The gate driving circuit of claim 6, wherein a source electrode of the third transistor is coupled to a ground voltage line to which a ground voltage is applied.

8. The gate driving circuit of claim 1, wherein a source electrode of the pull-up transistor is coupled to a clock line to which a clock signal is applied.

9. The gate driving circuit of claim 8, wherein a source electrode of the pull-down transistor is coupled to a ground voltage line to which a ground voltage is applied.

10. The gate driving circuit of claim 9, wherein a source electrode of the first transistor is coupled to the ground voltage line to which the ground voltage is applied.

11. The gate driving circuit of claim 8, wherein a source electrode of the pull-down transistor and a source electrode of the first transistor ae coupled to a ground voltage line to which a ground voltage is applied.

12. The gate driving circuit of claim 1, wherein the first transistor of the N stage discharges the Q node of the N−1 stage with a ground voltage in response to a signal of the output terminal of the N stage.

13. A display apparatus comprising:
a display panel; and
the gate driving circuit according to claim 1 that is configured to drive the display panel.

14. A gate driving circuit comprising:

a plurality of stages driving a plurality of gate lines, each of the plurality of stages comprising:

a pull-up transistor configured to pull-up drive an output terminal in response to a signal of a Q node of N−1 stage;

a pull-down transistor configured to pull-down drive an output in response to a signal of a Qb node of the N−1 stage; and a first transistor coupled between the Q node of the N−1 stage and a source electrode of a pull-down transistor of a N stage, the first transistor configured to pull-down drive the Q node of the N−1 stage in response to a signal of an output terminal of the N stage, wherein a gate electrode and a source electrode of the first transistor of the N stage which is a last stage of the plurality of stages are opened by cutting.

15. The gate driving circuit of claim 14, further comprising:

an inverter coupled between the Q node and the Qb node of the N−1 stage, the inverter configured to invert a signal of the Q node and outputting the inverted signal to the Qb node.

16. The gate driving circuit of claim 14, further comprising:

a second transistor configured to pull-up drive the Q node of the N−1 stage in response to a signal of an output terminal of a N−2.

17. The gate driving circuit of claim 16, wherein a source electrode of the second transistor is coupled to a power voltage line to which a power voltage is applied.

18. The gate driving circuit of claim 16, further comprising:

a third transistor coupled to a drain electrode of the second transistor, the third transistor configured to pull-down drive the Q node of the N−1 stage in response to a global reset signal.

19. The gate driving circuit of claim 18, wherein a source electrode of the third transistor is coupled to a ground voltage line to which a ground voltage is applied.

20. The gate driving circuit of claim 14, wherein a source electrode of the pull-up transistor is coupled to a clock line to which a clock signal is applied.

* * * * *